(12) United States Patent
Stewart et al.

(10) Patent No.: US 10,391,840 B2
(45) Date of Patent: Aug. 27, 2019

(54) ADAPTABLE ROOF-MOUNTED AIR CONDITIONING SYSTEM FOR VEHICLES

(71) Applicant: TransArctic Canada, Inc., Woodstock (CA)

(72) Inventors: James Stewart, Woodstock (CA); Dale Mason, Woodstock (CA); Kevin Larin, Woodstock (CA); Norman Gillespie, Woodstock (CA)

(73) Assignee: TRANSARCTIC CANADA, INC., Woodstock (CA)

( * ) Notice: Subject to any disclaimer, the term of this patent is extended or adjusted under 35 U.S.C. 154(b) by 327 days.

(21) Appl. No.: 15/211,579

(22) Filed: Jul. 15, 2016

(65) Prior Publication Data

US 2018/0015809 A1    Jan. 18, 2018

(51) Int. Cl.
*B60H 1/00* (2006.01)
*B60H 1/32* (2006.01)

(52) U.S. Cl.
CPC ....... *B60H 1/3229* (2013.01); *B60H 1/00371* (2013.01); *B60H 1/00535* (2013.01); *B60H 1/00542* (2013.01); *B60H 1/00528* (2013.01); *B60H 2001/00235* (2013.01)

(58) Field of Classification Search
CPC .............. B60H 1/3229; B60H 1/00371; B60H 1/00535; B60H 2001/00235; B60H 1/00528; B60H 1/00542
See application file for complete search history.

(56) References Cited

U.S. PATENT DOCUMENTS

| 4,982,583 | A | * | 1/1991 | Matsuda | B60H 1/3204 62/244 |
| 5,005,372 | A | * | 4/1991 | King | B60H 1/00371 62/244 |
| 6,415,620 | B1 | * | 7/2002 | Ferdows | B60H 1/00371 62/244 |
| 9,126,293 | B2 | * | 9/2015 | Uto | B60H 1/00535 |
| 2010/0024458 | A1 | * | 2/2010 | Schmitt | B60H 1/00371 62/239 |
| 2010/0218530 | A1 | * | 9/2010 | Melbostad | B60H 1/00371 62/244 |

FOREIGN PATENT DOCUMENTS

DE    102012216039 A1 *  5/2014  ......... B60H 1/00371

* cited by examiner

*Primary Examiner* — Frantz F Jules
*Assistant Examiner* — Lionel Nouketcha
(74) *Attorney, Agent, or Firm* — Perry + Currier Inc.

(57) ABSTRACT

An air conditioning system for mounting on a vehicle roof includes a condenser module and an evaporator module. The condensor module includes an inlet for receiving a compressed fluid, a heat exchanger for condensing the fluid and transferring heat from the fluid, and an outlet for releasing the condensed fluid. The evaporator module includes a deformable base for placement on the roof, that conforms to the roof's curvature. The evaporator module also includes an inlet receiving the cooled condensed fluid from the condensor outlet, an expansion valve for vaporizing the fluid, a heat exchanger for transferring heat to the vaporized fluid, and an outlet for returning the heated vaporized fluid to the condenser module via a compressor. The evaporator module also includes an interchangeable end plate connected to an end of the base, which maintains the base in a shape that conforms to the curvature of the roof.

22 Claims, 9 Drawing Sheets

ADAPTABLE ROOF-MOUNTED AIR CONDITIONING SYSTEM FOR VEHICLES

FIELD

The specification relates generally to air conditioning systems for vehicles, and specifically to a roof-mounted air conditioning system that is adaptable to a variety of vehicle roof curvatures.

BACKGROUND

Various systems exist to retrofit vehicles such as buses with air conditioning units, including units that are roof-mounted. Such vehicles frequently have curved roofs, and the radius of curvature of the roof may vary between vehicle models. Typically, the installation of the above-mentioned roof-mounted air conditioning systems requires one or more time-consuming procedures to compensate for the roof's curvature, which may raise the cost of installation. For example, some systems require the insertion of a substantial portion of the system into the vehicle's roof (i.e. by removing a portion of the roof's outer layer, and potentially modifying the internal structural components of the roof). Further, some systems require the installation of various supporting structures within or on the outside of the roof to support the air conditioning system.

Some conventional roof-mounted air conditioning systems attempt to reduce the need for the accommodations mentioned above by reducing the overall size of the system, particularly the width of the system (e.g. in the direction perpendicular to the length of the vehicle). However, such reductions in size can negatively affect air flow through the system, as well as render system maintenance difficult.

SUMMARY

An air conditioning system for mounting on a vehicle roof is provided, comprising: a condenser module including a condensing fluid path defined by (i) a condenser inlet for receiving a compressed fluid, (ii) a condenser heat exchanger for condensing the fluid and transferring heat from the fluid, and (iii) a condenser outlet for releasing the condensed fluid; an evaporator module including: a base for placement on an outer surface of the roof; the base being deformable to conform to a curvature of the roof; an evaporating fluid path supported by the base and defined by (i) an evaporator inlet receiving the cooled condensed fluid from the condensing fluid path outlet, (ii) an expansion valve for vaporizing the fluid, (iii) an evaporator heat exchanger for transferring heat to the vaporized fluid, and (iv) an evaporator outlet for returning the heated vaporized fluid to the condenser module via a compressor; and an interchangeable end plate connected to an end of the base; the end plate configured to maintain the deformable base in a shape that conforms to the curvature of the roof.

BRIEF DESCRIPTIONS OF THE DRAWINGS

Embodiments are described with reference to the following figures, in which.

DETAILED DESCRIPTION OF THE EMBODIMENTS

Figure 1:
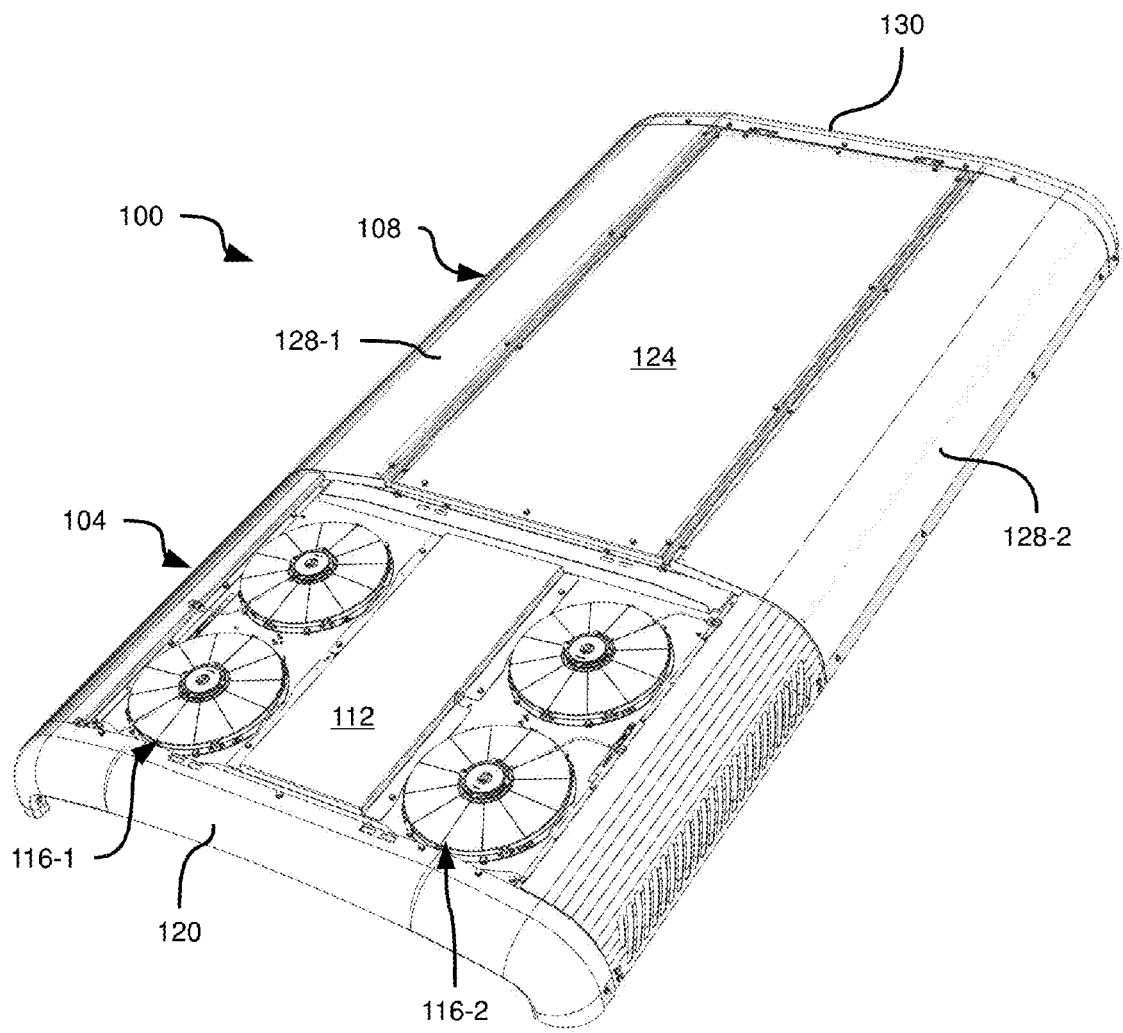
FIG. 1 depicts a top perspective view of an adaptable roof-mounted air conditioning system, according to a non-limiting embodiment.

FIG. 1 depicts an air conditioning system 100 for mounting on the roof of a vehicle (not shown). System 100 may be mounted to the roof of any of a wide variety of vehicles, including automobiles, buses (e.g. school buses), train cars, boats, and the like. In the embodiments described below, system 100 will be discussed in conjunction with its installation on the roof of a bus; however, it will be understood that the use of system 100 with a bus is exemplary and that system 100 may also be employed with other types of vehicles.

System 100 includes a condenser module 104 and an evaporator module 108. As will be discussed in greater detail below, condenser module 104 is configured to remove heat from an air conditioning fluid (e.g. a refrigerant), while evaporator module 108 is configured to transfer heat to the fluid. In the embodiments discussed herein, system 100 is a cooling system, and thus evaporator module 108 is configured to transfer heat (preferably, though not necessarily) from the interior of the vehicle to the fluid in order to supply cooled air to the interior of the vehicle. Condenser module 104, meanwhile, is configured to exhaust heat from the fluid to the exterior of the vehicle. In other embodiments, system 100 may be adapted for operation as a heat pump, with condenser module 104 absorbing heat from the exterior of the vehicle, and evaporator module 108 exhausting heat into the vehicle.

Condenser module 104 includes a condensing fluid path defined by a set of components hidden from view in FIG. 1 by a cover 112, ventilation assemblies 116-1 and 116-2 (generically referred to as a ventilation assembly 116, and collectively referred to as ventilation assemblies 116—this nomenclature is also used elsewhere herein), and an intake shroud 120. Evaporator module 108, meanwhile, includes an evaporating fluid path defined by a set of components hidden from view in FIG. 1 by a central cover 124, ventilation compartment covers 128-1 and 128-2, and a rear shroud 130.

Figure 2:
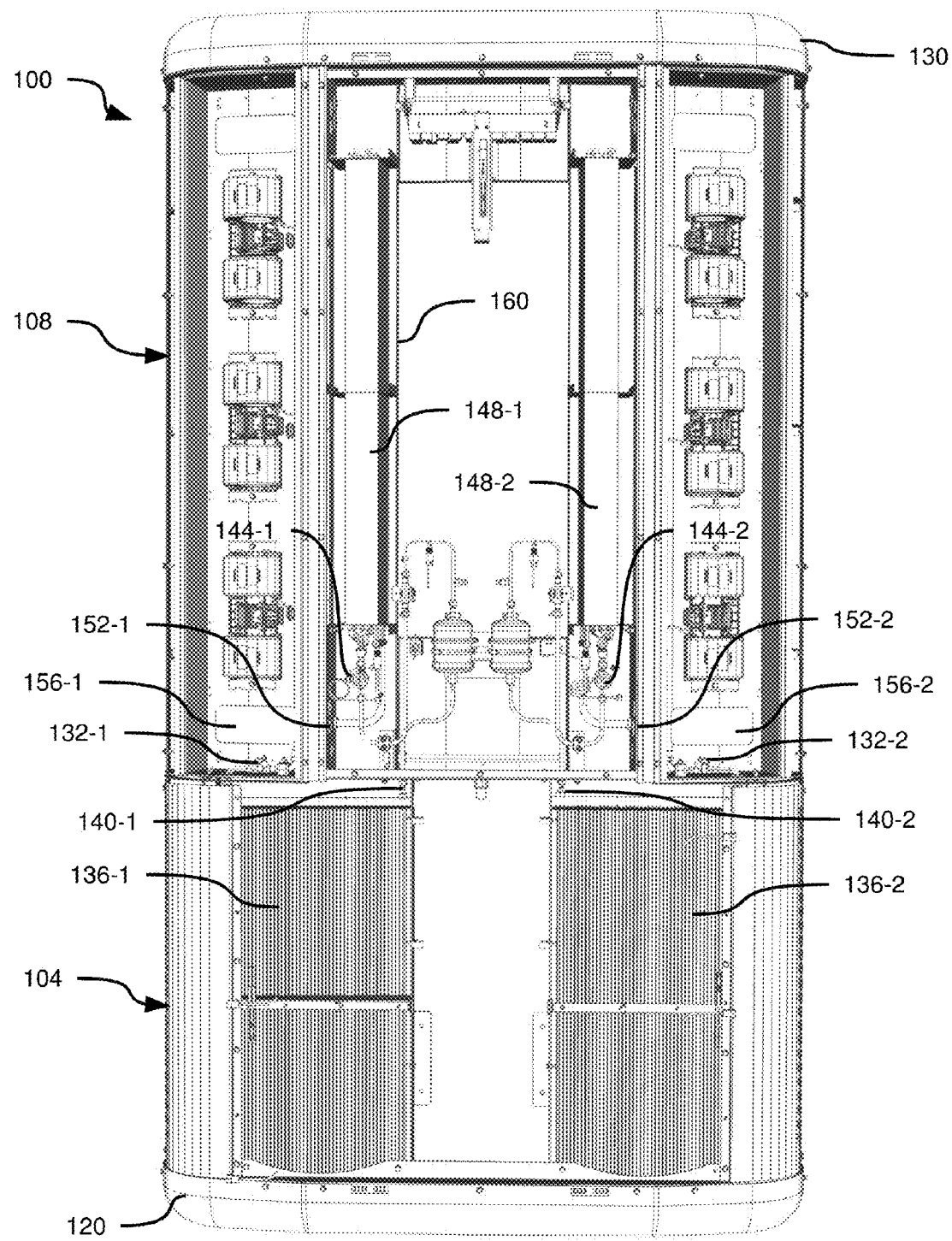
FIG. 2 depicts a top view of the system of FIG. 1, according to a non-limiting embodiment.

Turning to FIG. 2, system 100 is illustrated with covers 112, 124 and 128, as well as ventilation assemblies 116, removed. The components of the above-mentioned condensing and evaporating fluid paths are visible in FIG. 2. In the present embodiment, condenser module 104 and evaporator module 108 each include two independent condenser and evaporator fluid paths, respectively. In particular, the condensing fluid paths include a condenser inlet 132-1, 132-2 for receiving a compressed (and typically gaseous) fluid from a compressor. The compressor is not shown, as in the present embodiment the compressor (one for each condensing fluid path) is located in or near the engine compartment of the vehicle. For example, the compressor may be mechanically driven by a power take-off belt from the engine, or by an auxiliary engine. In other embodiments, compressors may be located within system 100, as will be discussed later herein.

Each condenser fluid path also includes a condenser heat exchanger (also referred to herein as a condenser coil) 136-1, 136-2. Condenser coils 136 are configured to receive the compressed fluid via line connecting inlets 132 with coils 136, and to condense the fluid and transferring heat from the fluid (e.g. to air circulating through the fins of condenser coils 136), thus cooling the condensed fluid. Each condensing fluid path also includes a condenser outlet 140-1, 140-2 for releasing the cooled, condensed fluid.

Each evaporator fluid path includes an evaporator inlet (which coincide with condenser outlets 140) for receiving the cooled, condensed fluid from the corresponding condensing fluid path. The evaporator inlet and one or more fluid lines (e.g. copper conduits or the like) deliver the cooled, condensed fluid to an expansion valve 144-1, 144-2 for vaporizing the fluid and delivering a metered flow of vaporized fluid to an evaporator heat exchanger 148-1, 148-2 (also referred to as evaporator coils 148). While travelling through evaporator coils 148, the vaporized fluid absorbs heat from air circulating through the fins of evaporator coils 148, thus cooling the air. Upon exiting the evaporator coils 148, the heated vaporized fluid travels to an evaporator outlet 152-1, 152-2 in order to return to the corresponding condenser fluid path via a compressor.

As will now be apparent, outlets 152 are connected to conduits, such as rubber hoses (not shown) that carry the heated fluid to the compressors; further conduits (e.g. additional rubber hoses) return from the compressors and deliver the heated compressed fluid to inlets 132. In the present embodiment, the above-mentioned hoses travel within the vehicle's roof (i.e. between inner and outer panels of the roof) and extend into the evaporator module 108 through openings 156-1, 156-2 in a base 160 of the evaporator module. That is, the connections between the hoses and the inlets and outlets 132 and 152 of system 100 are placed above the outer surface of the roof, inside system 100, rather than within the roof or within the vehicle (i.e. below the inner surface, or ceiling, of the roof).

Each pair of a condenser fluid path and an evaporator fluid path, together with the corresponding compressor, thus forms a closed loop in which the air conditioning fluid circulates to collect heat from one location (e.g. the interior of the vehicle) in the evaporator module 108 and discharge heat to another location (e.g. the exterior of the vehicle) in the condenser module 104. System 100 therefore includes two independent fluid circuits in the present embodiment. In other embodiments, however, system 100 need not include two independent circuits—one circuit can be omitted, or the components of the second circuit (e.g. those denoted with the suffix "2" in FIG. 2) can be in fluid communication with the components of the first circuit. For example, the circuits can be arranged in parallel, both supplied by a single compressor.

Certain structural features of evaporator module 108 will now be discussed in greater detail. As will be apparent to those skilled in the art, the roofs of vehicles such as buses are typically curved, with a radius of curvature substantially perpendicular to the length (from the front to the rear) of the vehicle. In general, evaporator module 108 is configurable to adapt to various such curvatures.

Figure 3A:
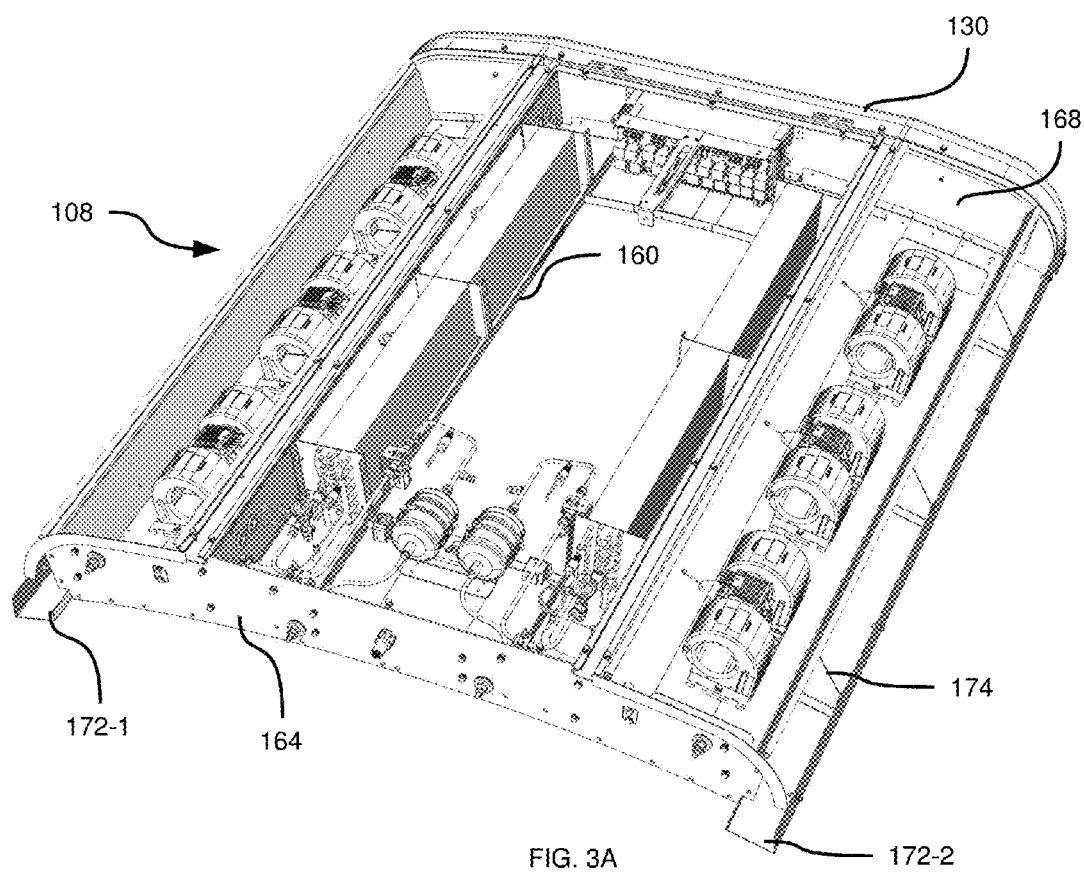
FIGS. 3A and 3B depict top perspective and rear views of an evaporator module of the system of FIG. 1, according to a non-limiting embodiment.
Figure 3B:
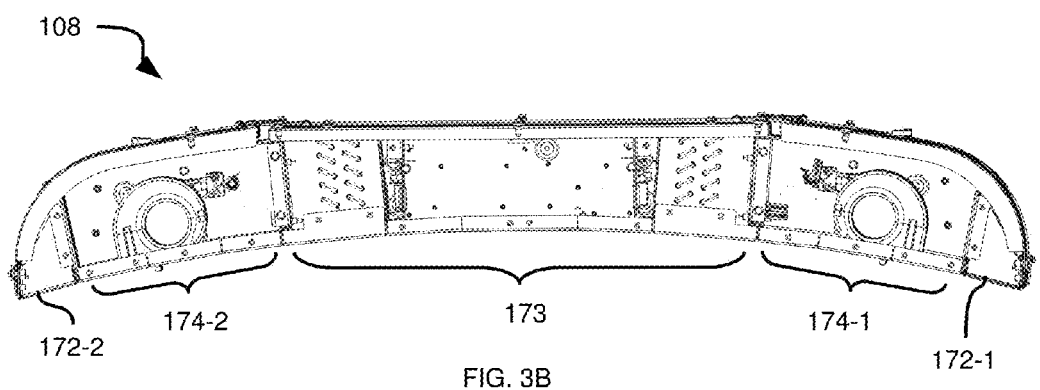

Specifically, turning to FIG. 3A, evaporator module 108 is shown in isolation, with covers 124 and 128 removed. In addition to base 160, which supports the above-mentioned components defining the two evaporation fluid paths, evaporator module 108 includes at least one interchangeable end plate. In the present embodiment, evaporator module 108 includes a first interchangeable end plate 164 and a second interchangeable end plate 168, disposed at opposite ends of module 108. End plate 164 includes openings therethrough to permit fluid communication between modules 104 and 108. Of particular note, base 160 is deformable to conform to the curvature of the roof. For example, base 160 may be fabricated of sheet metal or any other suitable material that is sufficiently flexible to deform to conform to any of a variety of roof curvatures. FIG. 3B depicts evaporator module 108 from the rear, with shroud 130 and end plate 168 removed, to illustrate the curvature of base 160.

When module 108 is assembled, end plates 164 and 168 are connected to base 160 and maintain base 160 in a shape that conforms to the specific curvature of the roof on which module 108 is installed. As seen in FIG. 3A, end plates 164 and 168 are arranged substantially perpendicular to the length of the vehicle, and extend upwards from an outer surface of the roof. End plates 164 and 168 are substantially rigid, and therefore prevent base 160 from further deformation once they are connected to base 160. For this reason, a plurality of interchangeable end plates may be manufactured to fix the curvature of base 160 in a variety of shapes each corresponding to a different roof curvature. Base 160 itself, on the other hand, need not be varied from roof to roof due to its deformability. That is, a plurality of substantially identical bases may be manufactured (along with the components supported by base 160), and installed on roofs with different radii of curvature.

As also illustrated in FIGS. 3A and 3B, evaporator module 108 can include interchangeable side flanges 172-1 and 172-2 connected to opposite sides of base 160 (e.g. by fasteners such as bolts, screws, welds or the like). Side flanges 172 are referred to as interchangeable because, like end plates 164 and 168, flanges 172 are specific to a given roof curvature. Flanges 172 provide lower attachment points for covers 128, and together with end plates 164 and 168, define a perimeter of evaporator module 108. In some embodiments, however, flanges 172 can be omitted (in such embodiments, covers 128 may terminate further above the outer surface of the roof than as shown in the drawings). Flanges 172 may also include one or more buttresses 174 extending upwards to contact a raised portion of base 160 (to be discussed in greater detail below) and provide additional structural rigidity to module 108.

FIG. 3B depicts evaporator module 108 from the rear (with shroud 130 and end plate 168 removed), and illustrates the deformation of base 160 to accommodate a roof curvature. Base 160 can defined by a single integral member, or by a plurality of members fastened to each other. As seen in FIG. 3B, in the present embodiment base 160 is defined by a central sheet of material 173 (supporting, for example, heat exchangers 148, and a pair of side sheets 174-1, 174-2 connected to opposite sides of central sheet 173. Sheets 173 and 174 can be connected to each other by any suitable fasteners, including any suitable one of, or combination of, bolts, screws, rivets, hinges and the like. As will be described below in greater detail, base 160 is divided into a plurality of articulable segments; in the present embodiment, each one of sheets 173, 174-1 and 174-2 defines a plurality of the above-mentioned segments.

Figure 4:
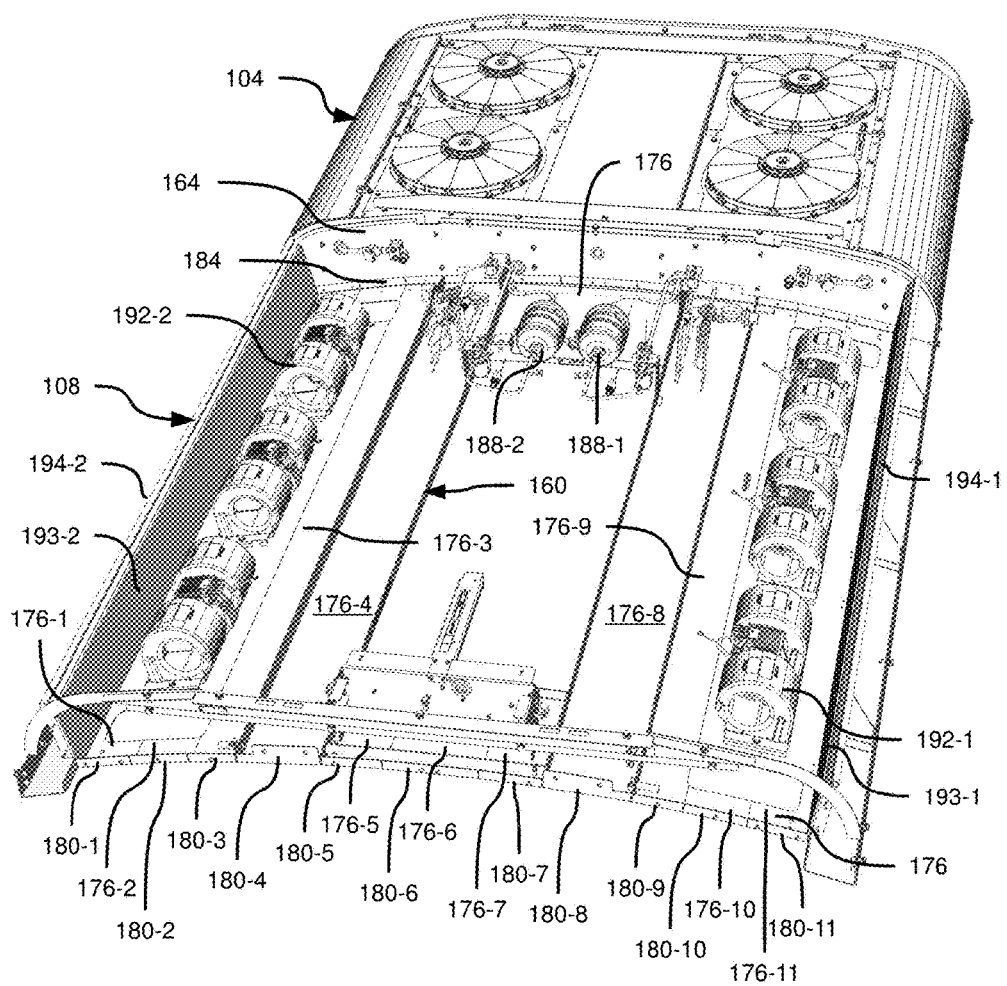
FIG. 4 depicts a top perspective view of the system of FIG. 1, according to a non-limiting embodiment.

Referring now to FIG. 4, the deformability of base 160 will be discussed in greater detail. In particular, as mentioned above, base 160 has a plurality of longitudinal segments 176-1, 176-2, 176-3, 176-4, 176-5, 176-6, 176-7, 176-8, 176-9, 176-10 and 176-11 that are articulable relative to each other prior to connection of the interchangeable end plates 164 and 168. Segments 176 can be defined by a single integral member, or by a plurality of independent members fastened to one another by any suitable fastening mechanism. In the present embodiment, segments 176-1, 176-2 and 176-3 are defined by sheet 174-2, segments 176-9, 176-10 and 176-11 are defined by sheet 174-1, and the remaining segments 176 are defined by central sheet 173. As will now be apparent, segments 176-5, 176-6 and 176-7 are broken by an opening in base 160, to be discussed further below.

Segments 176 are permitted to articulate relative to each other to a greater degree than each individual segment is permitted to flex as a result of an upwardly extending flange 180 at the end of each segment 176 (thus, in the present embodiment there are eleven flanges 180-1, 180-2, 180-3, 180-4, 180-5, 180-6, 180-7, 180-8, 180-9, 180-10 and 180-11), which imparts rigidity to the segment. As will now be apparent, flanges 180 enable the connection of base 160 to end plate 168 (not visible in FIG. 4, e.g. via apertures and corresponding bolts, or any other suitable fastening mechanism). A second set of flanges 184 (only one of which is labelled in FIG. 4 for illustrative purposes, corresponding to segment 176-2) may be provided at the opposite end of base 160, for connecting to end plate 164. Flanges 180 and 184 are substantially perpendicular to the main surface of base 160, and thus when module 108 is installed, flanges 180 and 184 extend upwards from the roof's outer surface. Although the embodiment illustrated in the drawings has eleven articulable segments 176 and corresponding flanges 180, a wide variety of other articulable configurations will be apparent to those skilled in the art for base 160.

In addition to the deformability of base 160, evaporator module 108 is configured to accommodate various roof curvatures by way of the arrangement of the components defining the evaporating fluid paths. Specifically, in the present embodiment, each component of each evaporating fluid path is supported on an individual segment 176. For example, each heat exchanger 148 (not shown in FIG. 4) and corresponding expansion valve 144 is supported on one segment. Each evaporating fluid path may also include a filter-drier 188-1, 188-2 (e.g. a receiver filter-drier) connected between the inlet coinciding with condenser outlet 140 and expansion valve 144. Filter driers 188 are supported on a different segment 176 than heat exchangers 148 in the present embodiment. More specifically, filter driers 188 are supported on a central segment 176 that is centered on the vehicle roof (i.e. extends along the apex of the roof). Heat exchangers 148 and expansion valves 144 can be supported on adjacent segments 176 disposed symmetrically on either side of the central segment 176.

Additionally, each evaporating fluid path includes fluid lines connecting the components thereof. The fluid lines can be any conduits suitable for transporting the air conditioning fluid; in the present example, the fluid lines are copper conduits. In particular, fluid lines connect each evaporator inlet 132 with the inlet of the corresponding filter-drier 188. Additional fluid lines connect the outlet of each filter-drier 188 with the corresponding expansion valve 144. Still further fluid lines connect each expansion valve 144 with the corresponding evaporator heat exchanger 148.

As seen, for example, in FIG. 2, the fluid lines entering and exiting filter-driers 188, as well as the fluid lines entering expansion valves 144 and the fluid lines exiting inlets 132, are substantially parallel to the length of the vehicle. In other words, the inlets and outlets themselves are substantially parallel to the length of the vehicle, although the remainder of the fluid lines may be placed at various angles. The longitudinal arrangement of the above-mentioned fittings permits rotation of the fluid lines at those fittings to accommodate deformation of base 160 to match the curvature of the vehicle's roof, while reducing or eliminating strain on the fittings. As is also apparent from FIG. 2, the inlets and outlets of condenser heat exchangers 136 are also oriented parallel to the length of the vehicle.

As seen in FIG. 2, evaporator outlets 152 are not oriented longitudinally. Although outlets 152 may be oriented longitudinally in other embodiments, such an orientation is not necessary to accommodate roof curvature, because the conduits carrying fluid from outlets 152 towards compressors are generally flexible hoses, rather than comparatively rigid copper lines. Additionally, in the present embodiment, outlets 152 are supported by the same sections 176 of base 160 as heat exchangers 148, and therefore there is no need to accommodate articulation between outlets 152 and heat exchangers 148.

Returning to FIG. 4, evaporator module 108 also includes at least one ventilation device configured to draw air through heat exchangers 148 to cool the air, and to expel the air into the interior of the vehicle. In the present embodiment, evaporator module 108 includes a plurality of ventilation devices, in the form of symmetrically disposed sets of centrifugal blowers 192-1, 192-2 (six blowers 192 in each set are shown, although in other embodiments, different numbers of blowers may be provided). Blowers 192 are supported on outer segments of base 160 in the present embodiment.

As will now be apparent, when covers 128 are in place, they cooperate with base 160 and heat exchangers 148 to form a compartment around blowers 192, such that air may only enter the compartment through heat exchangers 148. Further, when cover 124 is in place, air may not enter evaporation module 108 from the exterior of the vehicle. Instead, as will be seen below, air enters evaporation module 108 from within the vehicle. In other embodiments, cover 124 may be vented to allow entry of outside air; in further embodiments, end plate 168 and rear shroud 130 can be vented instead of, or in addition to, cover 124 to allow entry of outside air.

Also shown in FIG. 4 are raised walls 193-1, 193-2 connected to base 160, for providing additional structural rigidity to base 160. Walls 193 may be fastened to base 160 by any suitable fastening mechanism, or they may be integral with base 160. Indeed, walls 193 may be modified segments 176 that have been bent upwards to be substantially perpendicular with the remainder of base 160. The upper edges of walls 193 may bear a weather seal 194-1, 194-2. Seals 194 can cooperate with covers 128 to reduce or eliminate air entry into module 108 from the exterior of module 108.

Figure 5:
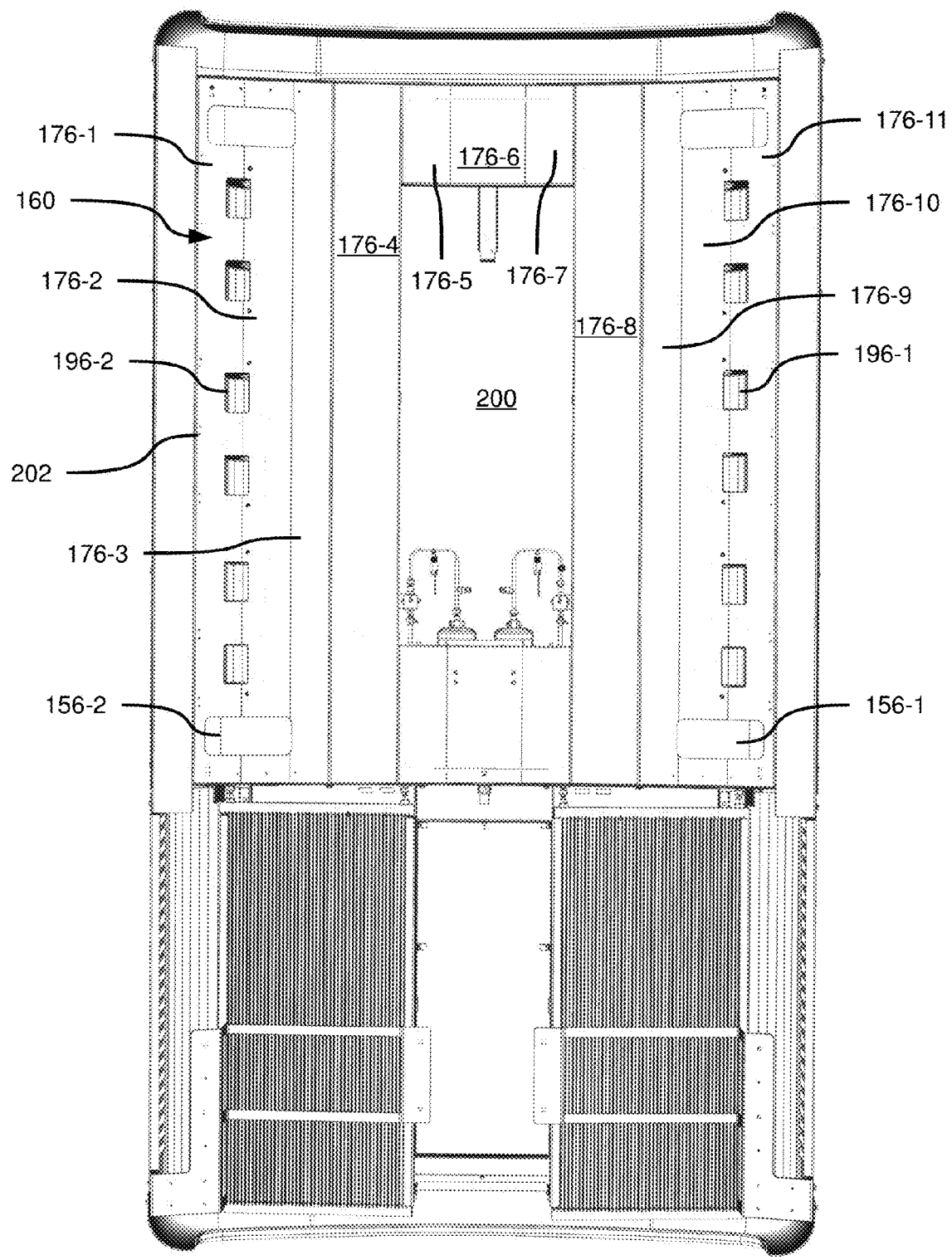
FIG. 5 depicts a bottom view of the system of FIG. 1, according to a non-limiting embodiment.

Referring now to FIG. 5, a bottom view of system 100 is shown. Base 160 includes a plurality of apertures 196-1, 196-2 in communication with the outlets of blowers 192. Prior to installation of system 100 on the vehicle roof, corresponding apertures are cut through the roof, allowing cooled air expelled by blowers 192 through apertures 196 to enter the vehicle through the corresponding roof apertures. The roof apertures may simply exhaust directly into a passenger compartment of the vehicle, or they may exhaust into ducting within the vehicle's interior.

As shown in FIG. 5, base 160 also defines an air intake and service opening 200. Opening 200 corresponds to an opening through the vehicle's roof, and permits air to enter evaporation module 108 (e.g. through the action of blowers 192) for cooling. Within the interior of the vehicle, a panel bearing an air filter may be mounted over the corresponding roof opening.

Also shown in FIG. 5 are a plurality of holes 202 through the bottom of base 160 for receiving fasteners (e.g. bolts, screws, rivets and the like). The roof of the vehicle typically includes a plurality of rafters providing structural rigidity to the roof. Base 160 is configured for connection directly to the roof rafters via the insertion of fasteners through holes 202 and into corresponding holes in the rafters.

Figure 6:
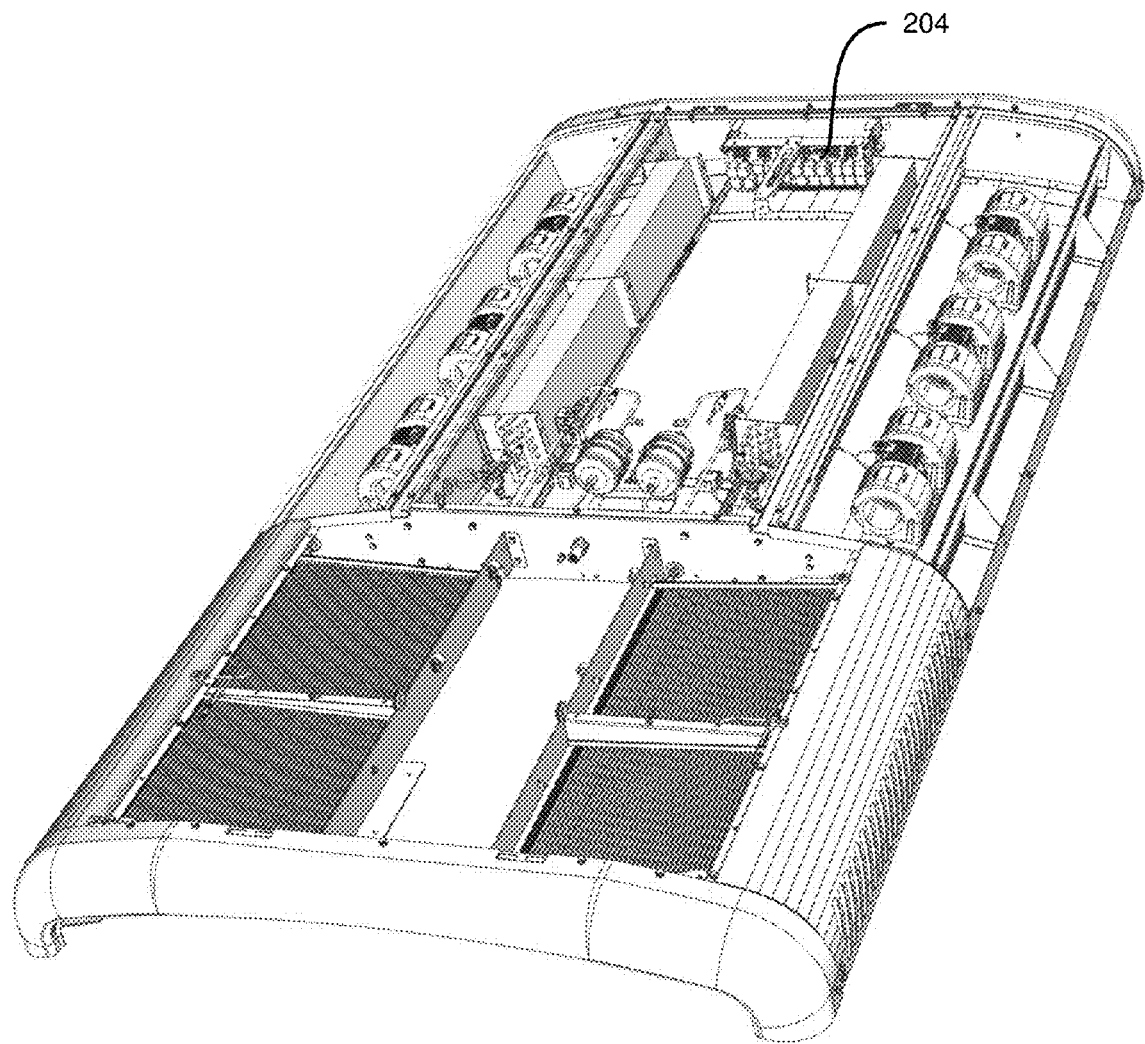
FIG. 6 depicts a top perspective view of the system of FIG. 1, according to a non-limiting embodiment.

In addition, opening 200 may be sized so as to allow an operator to access and view the interior of module 108 for diagnosing and servicing the components therein. For example, an electrical panel 204 (see FIG. 6), through which electrical power (e.g. from the battery of the vehicle) for the components of system 100 can be routed, can be disposed within module 108 so as to be readily visible to an operator accessing the interior of module 108 via opening 200. Panel 204 can also include status indicators (e.g. indicator lights and the like) for any suitable collection of the components of system 100. When the above-mentioned filter panel is included, the panel may be removable or otherwise openable (e.g. via a set of hinges) to allow operator access to the interior of module 108.

Figure 7A:
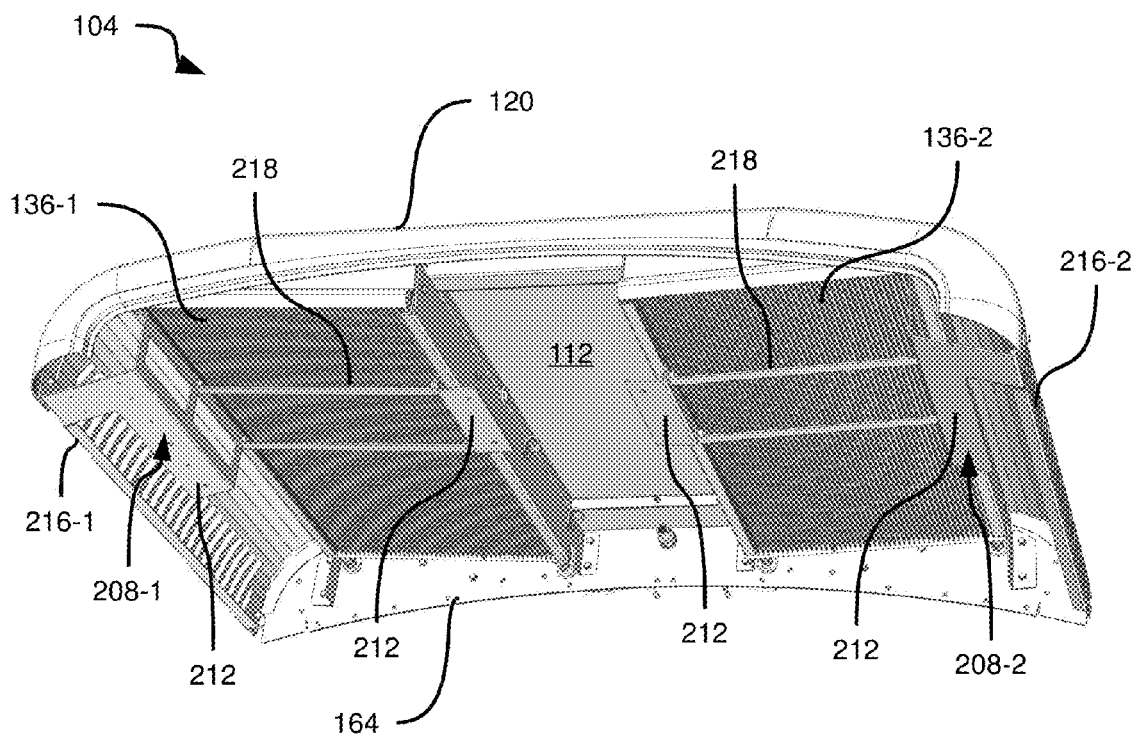
FIGS. 7A and 7B depict bottom perspective and front views of a condenser module of the system of FIG. 1, according to a non-limiting embodiment.

Referring now to FIG. 7A, condenser module 104 will be discussed in further detail. Module 104 is also configured to accommodate the curvature of the vehicle roof, via the inclusion of interchangeable heat exchanger supports 208. Each support 208 includes at least one bearing surface 212 (each support 208 includes two bearing surfaces 212 in the present embodiment) for placement upon the outer surface of the vehicle roof to which system 100 is to be mounted. An outer edge of each support 208 can be configured to fasten to a skirt 216-1, 216-2 (which may be vented to allow air to enter module 104. As will now be apparent, supports 208 are referred to as interchangeable because, like end plates 164 and 168, supports 208 are specific to a given roof curvature, and the remaining components of condenser module 104 can be installed on any of a variety of roof curvatures by selecting different supports 208.

Supports 208 are configured to position heat exchangers 136 (e.g. via one or more inclined beams 218 extending between bearing surfaces 212) such that the end surface of each heat exchanger 136 bearing the inlet 132 and outlet 140 is substantially perpendicular to the length of the vehicle, and such that the inlet 132 is raised and located away from the apex of the curvature of the roof relative to the outlet 140. In other words, as seen in FIG. 7A, each heat exchanger 136 is angled upwards from the outlet 140 to the inlet 132. This orientation permits the heat exchangers to operate as receivers (i.e. to store condensed fluid for release via outlets 140), and also provides a lateral chamber 220 (see FIG. 7B) beneath each heat exchanger into which air can enter via the intake in shroud 120. When skirts 216 are vented, air can also enter chambers 220 through the vents in skirts 216.

Figure 7B:
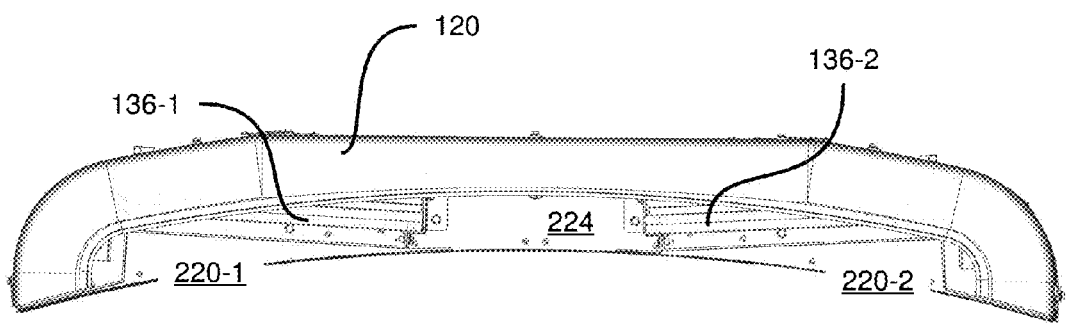

As seen in FIG. 7B, in addition to lateral chambers 220, condenser module includes a central chamber 224 defined between the roof of the vehicle, cover 112, and heat exchangers 136. Air can enter central chamber 224 through intake shroud 120; because intake shroud 120 is oriented in the forward direction on the vehicle, vehicle movement can drive air into central chamber 224 and lateral chambers 220. In other words, intake shroud 120 is configured to operate as a ram-air intake when the vehicle is in motion.

Intake shroud 120 can also be configured to direct air that does not enter chambers 220 and 224, but rather is deflected over the leading surface of shroud 120 during vehicle motion, over the upper surface of condenser module 104. Such airflow may generate a region of lower pressure over the upper surface of module 104 relative to the air pressure within chambers 220 and 224, thus improving air flow through heat exchangers 136.

Figure 8:
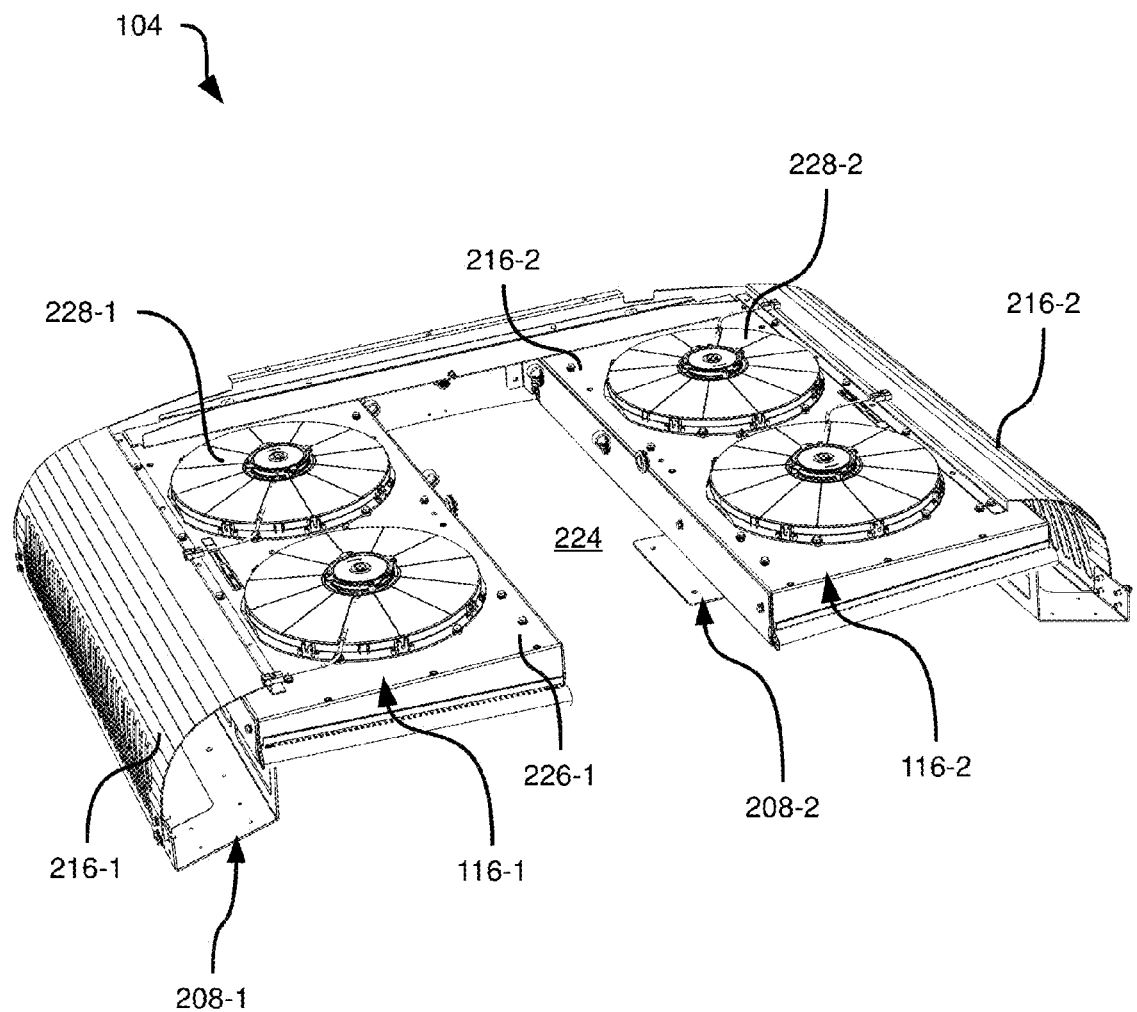
FIG. 8 depicts a top perspective view of the module of FIGS. 7A and 7B, according to a non-limiting embodiment.

Referring now to FIG. 8, module 104 is shown with cover 112 and shroud 120 removed to expose ventilation assemblies 116. Each ventilation assembly 116 includes an enclosure 226 over an upper surface of the corresponding heat exchanger 136, such that air may reach the upper surface of the corresponding heat exchanger 136 by travelling through the heat exchanger 136 from chambers 220 and 224. Air is substantially prevented from reaching the upper surface of heat exchangers 136 without having travelled through heat exchangers 136.

Each ventilation assembly 116 can also include at least one ventilation device 228. In the present embodiment, each assembly 116 includes two ventilation devices 228 in the form of fans configured to expel air from the enclosure. As will now be apparent, other numbers of ventilation devices may also be provided, and other types of ventilation devices may also be employed.

In embodiments in which the compressors are electrically powered rather than mechanically powered (e.g. by power take-off as mentioned earlier), a compressor for each fluid circuit can be placed within central chamber 224. The placement of compressors within chamber 224 permits the compressors to be cooled by ram intake air flow when the vehicle is in motion.

Other variations to the above embodiments are also contemplated. For example, cover 112 can include a plurality of openings therein provided by pressure-activated valves such as hinged flaps or the like. When external pressure (that is, pressure outside module 104) is equal to or greater than pressure within chamber 224, such flaps are configured to hang open, permitting air to enter chamber 224 from above module 104 (e.g. when the vehicle is not moving). When the internal pressure exceeds the external pressure, however, the flaps are configured to close under the effect of the greater internal pressure, thus converting chamber 224 into a ram-air intake.

Additionally, in some embodiments modules 104 and 108 can be separated, rather than coupled to each other as illustrated in the drawings. System 100 can therefore be adapted to vehicles with roofs bearing various combinations of emergency hatches, service access ports, solar panels or other equipment that would interfere with the installation of modules 104 and 108 as a single, integrated unit.

As a further example variation, shrouds 120 and 130, covers 128 and skirts 216 can be interchangeable components manufactured to match specific roof curvatures, or those components (or any subset thereof) can be manufacture in a single form and trimmed at the time of installation to match the relevant roof curvature.

Figure 9:
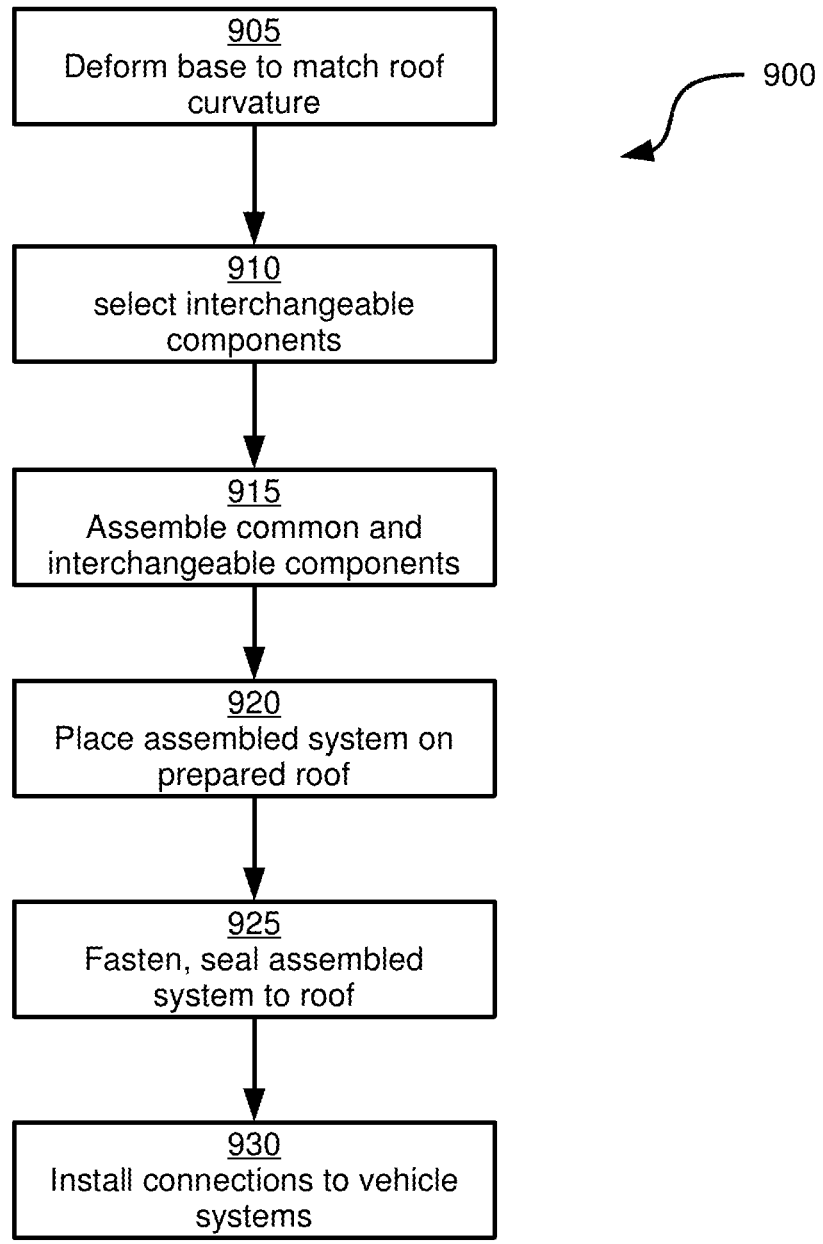
FIG. 9 depicts a method for installing the system of FIG. 1, according to a non-limiting embodiment.

A method of installation of system 100 is also contemplated. Turning to FIG. 9, a method 900 of installing system 100 on a vehicle is depicted. At block 905, base 160 is deformed to match the curvature of the roof onto which system 100 is to be mounted. The deformation of base 160 can be achieved by placing base 160 on the roof itself, or on a model having the same curvature of the roof.

At block 910, the interchangeable components of system 100 are selected. In particular, end plates 164 and 168, as well as flanges 172 (if being employed), are selected to match the curvature of the roof upon which system 100 is to be installed. In addition, if any of shrouds 120 and 130, covers 128, and skirts 216 are interchangeable, the appropriate shrouds, covers and skirts are selected at block 910.

At block 915, the common components of system 100 (that is, the non-interchangeable components, such as base 160, heat exchangers 136 and 148, ventilation devices 192, ventilation assemblies 116 and the like) as well as the interchangeable components are assembled. If any of the covers, shrouds and skirts are non-interchangeable but require trimming to match the curvature of the roof, such trimming can also be performed at block 915. Alternatively, the covers, shrouds and skirts may be trimmed at block 915 but not yet installed.

At block 920, when system 100 has been assembled on a model of the roof, system 100 is lifted from the model (e.g. by crane or other hoisting mechanisms) onto the roof, which has been previously prepared with openings cut therethrough corresponding to apertures 196 and openings 156 and 200.

At block 925, following placement of system 100 on the roof, system 100 may be fastened to the roof (e.g. by fastening base 160 to roof rafters via holes 202 as well as bearing surfaces 212). System 100 may also be sealed to the roof, for example by caulking the periphery of system 100. If the covers, shrouds and skirts have not yet been installed, they are installed following the completion of block 930.

At block 930, system 100 is connected to vehicle electrical and mechanical power sources (e.g. batteries, main or auxiliary engines and the like) as required. In addition, any fluid lines necessary to carry air conditioning fluid between modules 104 and 108 an compressors (when compressors are not located within module 104) are also routed through the roof of the vehicle.

The scope of the claims should not be limited by the embodiments set forth in the above examples, but should be given the broadest interpretation consistent with the description as a whole.

The invention claimed is:

1. An air conditioning system for mounting on a vehicle roof, comprising:
   a condenser module including a condensing fluid path defined by (i) a condenser inlet for receiving a compressed fluid, (ii) a condenser heat exchanger for condensing the fluid and transferring heat from the fluid, and (iii) a condenser outlet for releasing the condensed fluid;
   an evaporator module including:
      a base for placement on an outer surface of the roof; the base including a plurality of longitudinal segments articulable relative to each other such that the base is deformable to conform to a curvature of the roof prior to installation of the air conditioning system;
      an evaporating fluid path supported by the base and defined by (i) an evaporator inlet receiving the cooled condensed fluid from the condensing fluid path outlet, (ii) an expansion valve for vaporizing the fluid, (iii) an evaporator heat exchanger for transferring heat to the vaporized fluid, and (iv) an evaporator outlet for returning the heated vaporized fluid to the condenser module via a compressor; and
      an interchangeable end plate connected to an end of each of the longitudinal segments of the base; the end plate configured to prevent further articulation of the longitudinal segments and maintain the deformable base in a shape that conforms to the curvature of the roof.

2. The air conditioning system of claim 1, wherein the curvature has a radius that is substantially perpendicular to a length of the vehicle.

3. The air conditioning system of claim 1, wherein each longitudinal segment of the base includes an upwardly extending flange configured to extend upwards from the outer surface of the roof.

4. The air conditioning system of claim 3, wherein the interchangeable end plate is configured for connection to each of the upwardly extending flanges to maintain the deformable base in a shape that conforms to the curvature of the roof.

5. The air conditioning system of claim 1, wherein the evaporator module includes a second interchangeable end plate connected to an opposite end of the base.

6. The air conditioning system of claim 1, wherein the expansion valve and evaporator heat exchanger are supported on a first segment of the base.

7. The air conditioning system of claim 1, wherein the evaporating fluid path is further defined by a filter-drier connected between the evaporator inlet and the expansion valve.

8. The air conditioning system of claim 7, wherein the filter-drier is supported on a second segment of the base.

9. The air conditioning system of claim 8, wherein the evaporating fluid path is further defined by fluid lines extending between each of (i) the evaporator inlet and a filter-drier inlet; (ii) a filter-drier outlet and the expansion valve; and (iii) the expansion valve and the evaporator heat exchanger;
   wherein the fluid lines at the evaporator inlet, the filter-drier inlet, the filter-drier outlet and the expansion valve are substantially parallel to a length of the vehicle to permit rotation of the fluid lines for accommodating the deformation of the base.

10. The air conditioning system of claim 9, wherein the filter-drier inlet and the filter-drier outlet are coaxial.

11. The air conditioning system of claim 8, wherein the evaporator module further comprises a ventilation device configured to draw air through the evaporator heat exchanger to cool the air, and to expel the cooled air through an aperture in the base and a corresponding aperture in the roof of the vehicle.

12. The air conditioning system of claim 11, wherein the evaporator module includes a set of additional ventilation devices, wherein the ventilation device and the set of additional ventilation devices are supported on a third segment of the base adjacent to the first segment of the base.

13. The air conditioning system of claim 12, wherein the evaporator module includes a second evaporation fluid path having (i) a second evaporator inlet, (ii) a second filter-drier, (iii) a second expansion valve, (iv) a second evaporator heat exchanger, and (v) a second evaporator outlet.

14. The air conditioning system of claim 13, wherein the filter-drier and second filter-drier are supported on the second segment of the base; and wherein the second segment extends along an apex of the roof.

15. The air conditioning system of claim 14, wherein the second expansion valve and the second evaporator heat exchanger are supported on a fourth segment of the base; and wherein the first and fourth segments of the base are disposed symmetrically on either side of the second segment.

16. The air conditioning system of claim 15, wherein the evaporator module further comprising a second set of ventilation devices supported on a fifth segment of the base; and wherein the third and fifth segments of the base are disposed symmetrically on either side of the second segment.

17. The air conditioning system of claim 16, wherein the base defines an opening in the second segment corresponding to an air intake opening in the roof, for receiving air from the vehicle interior.

18. The air conditioning system of claim 17, wherein the evaporator module further comprises interchangeable side flanges extending from the end to the opposite end of the base along each of the third and fifth segments, such that the end plate, the second end plate and the interchangeable side flanges define a perimeter of the evaporator module.

19. The air conditioning system of claim 1, wherein an end surface of the condenser heat exchanger includes an inlet for receiving the compressed fluid and an outlet for releasing the condensed fluid; and wherein the inlet and the outlet are configured to orient fluid lines connected thereto parallel to a length of the vehicle.

20. The air conditioning system of claim 19, wherein the condenser module further includes an interchangeable heat exchanger support for placement on the outer surface of the roof and configured to match the curvature of the roof; and
    wherein the interchangeable heat exchanger support is configured to position the condenser heat exchanger such that the end surface is substantially perpendicular to the length of the vehicle, and such that the inlet is raised and located away from the apex of the curvature of the roof relative to the outlet.

21. The air conditioning system of claim 20, wherein the condenser module further comprises a second condenser heat exchanger and a second corresponding interchangeable heat exchanger support for placement on the outer surface of the roof symmetrically with the interchangeable heat exchanger support relative to the apex of the curvature.

22. The air conditioning system of claim 21, wherein the condenser module further comprises:
    a cover extending between the interchangeable heat exchanger support and the second interchangeable heat exchanger support to define a central chamber between the condenser heat exchangers;
    first and second ventilation assemblies supported by the heat exchanger supports over, respectively, the condenser heat exchanger and the second condenser heat exchanger, each ventilation assembly enclosing an upper surface of the corresponding condenser heat exchanger and having a ventilation device for exhausting air from the central chamber via the corresponding condenser heat exchanger.

* * * * *